Patented May 24, 1932

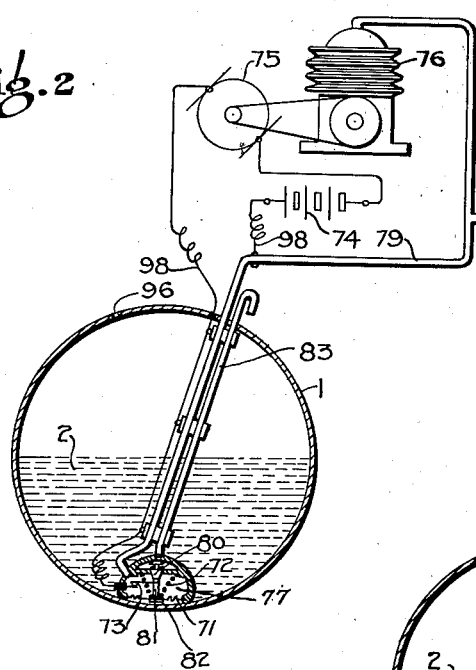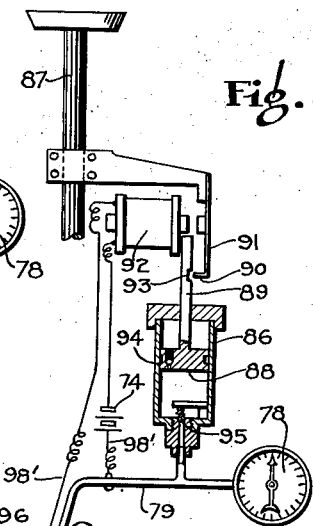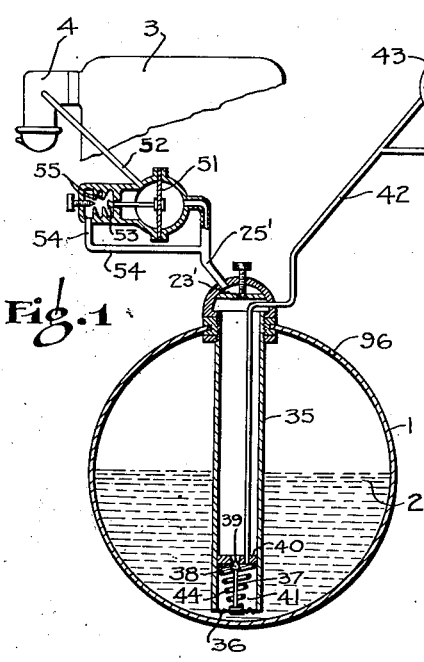

1,860,209

UNITED STATES PATENT OFFICE

FRANK M. SLOUGH, OF LAKEWOOD, OHIO

LIQUID LEVEL INDICATOR

Application filed November 29, 1929. Serial No. 410,385.

My invention relates to improvements in tank indicators and relates more particularly to improvements in indicating systems adapted to indicate the amount of liquid in a liquid container of an automotive vehicle, such as in the liquid fuel tank therefor.

An object of my invention is to provide an improved system and apparatus therefor, whereby the quantity of liquid such as may be contained in the fuel tank of such a vehicle, may be remotely indicated.

Another object of my invention is to provide such a system wherein vaporization of the liquid or trapping of gas or liquids in the conduits, of the system, cannot impair the efficiency of the apparatus and the reliability of the indications.

Another object of my invention is to provide a system wherein a gas below atmospheric pressure may be readily and simply employed to effect a reliable indication of the amount of liquid fuel in the automotive fuel supply tank.

Another object of my invention is to provide improved means to remotely indicate the amount of liquid contained in a container.

Another object of my invention is to provide improved means especially adaptable for installation on an automotive vehicle, for indicating in the passenger compartment thereof, the amount of liquid, such as oil, gas, water, or the like contained in a remotely disposed tank, carried by the vehicle.

Another object of my invention is to provide an improved electrical system for accomplishing any and/or all of the aforesaid objects.

Another object of my invention is to provide for accomplishing any and/or all of the aforesaid objects by means derived from the power of the engine employed for propelling the vehicle.

Another object of my invention is to provide improved means for indicating the amount of liquid in an automotive vehicle supporting the tank remotely thereof, employing a minimum of moving parts, and which will operate efficiently, even under adverse conditions.

Other objects of my invention and the invention itself will become apparent from the following description of certain embodiments of my invention, wherein reference will be had to the accompanying drawings illustrating the said embodiments:

Referring to the drawings—

Fig. 1 illustrates a system for indicating the amount of liquid in a fuel tank of an automotive vehicle.

Fig. 2 is a similar view of a second embodiment of my invention.

Fig. 3 is a like view of a third embodiment of my invention, and Fig. 4 is a like view of a fourth embodiment of my invention.

In the different figures of the drawings, each of these illustrate a section of a fuel tank of an automotive vehicle, an element exposed to the pressure of liquid contained therein, a source of power for exhausting air in a measuring chamber, an indicator to indicate the pressure in said measuring chamber, or pressure chamber, so-called, and means responsive to movements of the pressure operated element to vary the fluid pressure in the measuring chamber, whereby the indicator will be correspondingly operated to indicate the amount of liquid in the tank.

Referring now to the system of Fig. 1, I provide a tube 35 having its bottom end closed adjacent the bottom of the tank by a flexible diaphragm 36 and to the upper side of which diaphragm, a rod 37 is carried supporting at its upper end a valve 38, adapted to close a valve opening 39 in the upper wall 40 of a chamber 41 at the bottom end of the tube.

A conduit 42 is adapted to communicate fluid pressures between a fluid pressure indicating gage 43 and the fluid chamber 41 so that the pressure of fluid in the said chamber will always be indicated by the gage 43; a valve 26' and an adjustable orifice 27 by a screw 100 are provided in communication with the conduit 42, and may be manually so adjusted that at all times air will slowly be admitted from atmosphere to the conduit 42, and thereby communicated to the chamber 41 between the diaphragm 36 and the valve 39. Either the valve 26' or the mechanism comprising the orifice 27 and the adjustable screw 100, adapted to restrain flow of air through said orifice, may be alternatively employed, the other being either turned to wide opened position or omitted entirely. A spring 44 is compressed between the center of the diaphragm 36 and the underside of the chamber wall 40.

Fluid pressure exerted in an inward direction by the head of liquid in the tank 1, and either proportional or commensurable to its level, approximately, is exerted against the underside of the diaphragm 36.

The retractive effort of the spring 44 and the weight of the diaphragm carried parts are so proportioned relative to the possible "head" of liquid that when the gasoline tank is "full" the valve 38 will approximately be lifted with enough pressure to close the opening 39.

An adjustable orifice 23' is provided in the duct 25' leading from the intake manifold 4 of the engine 3, and functions to prevent a too rapid change in pressure to be communicated to the fluid pressure balancing chamber 41 of Fig. 1.

As will now be understood, when the level of gasoline in the tank is lowered, effecting a lessened pressure effort on the underside of the diaphragm 36, the valve 38 will be opened or if open will be opened more by the spring 44 acting upon the diaphragm. Subsequent greater lifting effort will then be exerted to gradually again close the valve, by "suction-action" exerted on the upper side of the diaphragm, effected by the resultant greater rarification of gas resulting from the opening of the valve to communicate some of the more dense gas in the chamber to the more rarified gas in the intake manifold; whereby reduction of pressure of the contained gas in the chamber 41, is effected.

The lifting effort required to offset the reduction in the quantity of gasoline is increased commensurably with such reduction and the valve operated by the liquid level responsive element is maintained open until the resultant increased lifting effort, which is measurable, is approximately equal to the effort tending to open the valve; the head of liquid and, therefore, the quantity of gasoline, is therefore indicated on the gage at 43, which at all times operates to indicate measurably, in terms of fluid pressure, the amount of such required lifting effort.

Adjacent the intake manifold 4, I show a controlling means applicable to the system of Fig. 1, wherein a diaphragm 51 is operated upon by fluid pressure in the duct 25' on its one side, and by fluid pressure communicated by a duct 52 from the intake manifold on its other side, and which diaphragm is movable in both directions to open and close a throttling valve 53 in a duct 54 leading from the intake manifold 4 to the duct 25'.

The duct 54 will preferably be provided with one or more orifices 55 to cause a difference of pressure to be exerted at the two ends of the duct when fluid is flowing therethrough. This arrangement may be provided to maintain a throttling valve 53 closed upon an excess of pressure on that side of the diaphragm communicating with the intake manifold 4, and which valve will be opened only upon an excess of rarification on the intake manifold side of the valve.

In the system of Fig. 1, I make the connection of the duct through the check valve instrumentality, comprising the diaphragm operated throttling valve and associated duct 54.

In Fig. 2 I show another embodiment of my invention, wherein the diaphragm 71 and spring 72 are disposed and operate as does the diaphragm 36 and spring 44 of Fig. 1. However, the system of Fig. 2 preferably dispenses with such a valve as that shown at 38 employing instead a set of electrical contacts 73 adapted to close a circuit comprising conductors 98 and the source of current 74, and an electrical motor 75, whenever the diaphragm is moved sufficiently by the spring 72 against the pressure exerted by the pressure of liquid exerted on its outer surface.

Closure of the contacts will cause current from the source, which may be the automobile battery, or generator, to start the motor which drives an exhausting or "vacuum" pump 76, to exhaust air from the space comprising the air chamber 77, to cause air pressure of atmosphere exerted against the surface of liquid in the tank to be effective to assist the pressure of liquid on the diaphragm to restore it to non-contact closing position; whereupon the motor and pump are stopped until, by subtracting more gasoline from the tank 1, the lessened pressure exerted against the bottom surface of the diaphragm 71, permits the spring plus weight of the parts to reclose the contacts, with consequent balancing of pressures, as before described.

The "vacuum" gage 78 in the line from the exhaust pump 76, and communicating with the chamber 77, will then indicate the quantity of gasoline in the tank.

In this embodiment, the motor 75, pump 76, and gage 78 will preferably be comprised in one unitary apparatus applied to the automobile or other vehicle instrument, board or "dash", and only a single conduit 79 will be required to extend to the tank at the remote part of the vehicle.

The chamber 77 may be vented, as described and shown for the chamber 41, Fig. 1, or, preferably, will be provided with a venting spring pressed valve 80, movable to admit enough air to restore an approximate balance of forces acting upon the diaphragm 71 whenever gasoline is added to the tank to cause the valve push rod 81, which is supported and removed by the upwardly moving diaphragm center plate 82, to engage and lift the valve 80 until a balance of pressures is restored and the rod 80 and valve 81 again disengaged. The conduit 83 leads from the chamber above the valve 80 exteriorly of the tank to atmosphere.

In Fig. 3, I show a modification of the system of Fig. 2, wherein the exhaust pump 86, adapted to exhaust air from the conduit 79, the chamber 77 and the gage 78, is mechanically driven by an automotive engine driven part, as for instance as shown herein, a reciprocatory valve push rod 87, which moves a piston rod 89 of the piston 88 of an exhaust pump 86, whenever the electro-magnetic clutch is operated.

The clutch comprises relatively movable clutching parts 89 and 90, and is operated by the electro-magnet 92, causing the spring carried armature 91 to be attracted, causing its end 90 to be drawn into the notch 93 of the rod 89, whenever current is passed through conductors 98' from the source of electrical current 74 through the contacts 73, one of which is movable by the diaphragm 71, into contact with a stationary contact as shown in Fig. 2.

The other parts are as shown in Fig. 2, the electro-magnet of Fig. 3 simply replacing the motor 75 of Fig. 2 in the electrical circuit.

The exhaust pump 86, may be of various known constructions, and may be provided as shown with spring pressed valves 95 and 94 having well known functions in such a pump. The valve 95 also serves to prevent communication between the conduit 79 and the pump cylinder when the pump is at rest, and the gas in the conduit is below atmospheric pressure.

In the different figures vents 96 are provided in an upper wall of the fuel tanks to keep the liquid therein under atmospheric pressure.

Fig. 4 is a view wherein the controlling mechanism applied to the tank, as shown in Fig. 1, is substituted for the controlling mechanism therefor, as shown in Fig. 2, the other parts of the system being as shown in Fig. 2.

In brief, Fig. 4 is an illustration of the use of an immersed displacement element 18' having a portion heavier than the displaced liquid, and bellows 71' instead of a diaphragm such as shown at 71, Fig. 2, for operating a valve 80' and a set of electrical contacts 73', in the manner shown in Fig. 2, for accomplishing the same purpose in substantially the same way, as is done in Fig. 2 by the diaphragm.

Also by substituting the displacement element 18' for the diaphragm 71, the use of a counter-pressure spring such as shown at 72, Fig. 2, is rendered unnecessary since the weight of the displacement element at low levels of liquid, accomplishes the same purpose in substantially the same way.

The present application is a continuation in part of the subject matter of my copending application, Serial No. 25,673, filed April 24, 1925, for indicating systems and apparatus.

Having thus described my invention in certain embodiments, I am aware that numerous and extensive departures may be made from the embodiments herein illustrated and described but without departing from the spirit of my invention; and that the different alternative instrumentalities shown in the different figures for different embodiments, may be alternatively employed for any of them.

I claim:

1. In a liquid depth indicating apparatus for liquid containers, a fluid pressure operable indicator disposed remotely to the container, a movable element subjected to the hydraulic pressure head of liquid in the tank and movable responsive to variations of the head, counter fluid pressure generating means, conduit means for communicating generated fluid pressure to the element to oppose the liquid pressure head, means to control the fluid pressure generating means comprising electric contacts associated with the movable element and movable to engagement and disengagement by movement of the element and an electro-responsive means for controlling operation of the fluid pressure generating means and controlled by the contacts, and conduit means communicating generated fluid pressure to the indicator.

2. An apparatus for measuring the quantity of liquid in a container, comprising a liquid displacement element having a portion heavier than the displaced liquid and extending close to the bottom of the container, and exposed to the buoyant effort of liquid therein, a pressure chamber having a movable wall, conduit means including an inlet port for admitting air from atmosphere to the chamber, a pressure gauge, a duct for effecting communication between the gauge and chamber, an exhausting means, a second conduit means including an exhaust port in the wall of said chamber, adapted to effect communication between the interior of the chamber and the exhausting means, a valve controlling the passage of air through the second conduit means, means to communicate operative movement to said valve from said wall, and means to communicate actuating pressure from the displacement element to the movable wall and electrical means comprising a set of electrical contacts and an electro-responsive device connected to said exhausting means, and a source of electrical current controlling the operation of said electro-responsive means and responsive to movements of the said movable wall.

3. An apparatus for measuring the quantity of liquid in a container, comprising a liquid displacement element having a portion heavier than the displaced liquid and extending close to the bottom of the container and exposed to the buoyant effect of liquid therein, a pressure chamber having a movable wall, conduit means including an inlet port for admitting air from atmosphere to the chamber, a pressure gauge, a duct for effecting communication between the gauge and chamber, an exhausting means, a second conduit means including an exhaust port in the wall of said chamber, adapted to effect communication between the interior of the chamber and the exhausting means, a valve controlling the passage of air through the second conduit means, means to communicate operative movement of said wall to said valve, and means to communicate actuating pressure from the displacement element to the movable wall, both said conduit means having orifice restrictions therein to retard the flow of fluid to and from said chamber.

4. In a liquid level indicating system for a liquid container, in combination, movable means subjected to the hydraulic pressure head of liquid in the container, and movable in a given direction responsive thereto, a fluid pressure indicator adapted to be disposed remotely to the container, a force exerting means exercising a substantially constant force on the movable means in opposition to the effect of liquid pressure exerted thereon and adapted to move it oppositely upon a reduction in value of the liquid pressure on said movable means, fluid pressure generating means, an actuating means for effecting operation of the pressure generating means operable responsive to a movement of said movable means effected by said force exerting means, the pressure generated being effective to commensurably operate said indicator and effective upon said movable means to approximately balance the opposing pressure of the liquid tending to move it.

5. In a liquid level indicating system for a liquid container, in combination, movable means subjected to the hydraulic pressure head of liquid in the container, and movable in a given direction responsive thereto, a fluid pressure indicator adapted to be disposed remotely to the container, a force exerting means exercising a substantially constant force on the movable means in opposition to the effect of liquid pressure exerted thereon and adapted to move it oppositely upon a reduction in value of the liquid pressure on said movable means, fluid pressure generating means, an actuating means for effecting operation of the pressure generating means operable responsive to a movement of said movable means effected by said force exerting means, the pressure generated being effective to commensurably operate said indicator and effective upon said movable means to approximately balance the opposing pressure of the liquid tending to move it, said force exerting means comprising a counter spring for said movable means.

6. In a liquid level indicating system for a liquid container, in combination, movable means subjected to the hydraulic pressure head of liquid in the container, and movable in a given direction responsive thereto, a fluid pressure indicator adapted to be disposed remotely to the container, a force exerting means exercising a substantially constant force on the movable means in opposition to the effect of liquid pressure exerted thereon and adapted to move it oppositely upon a reduction in value of the liquid pressure on said movable means, fluid pressure generating means, an actuating means for effecting operation of the pressure generating means operable responsive to a movement of said movable means effected by said force exerting means, the pressure generated being effective to commensurably operate said indicator and effective upon said movable means to approximately balance the opposing pressure of the liquid tending to move it, said force exerting means comprising a counter spring for said movable means, said pressure generating means comprising a fluid pressure chamber and means to vary the pressure of fluid contained therein.

7. In a liquid level indicating system for a liquid container, in combination, movable means subjected to the hydraulic pressure head of liquid in the container, and movable in a given direction responsive thereto, a fluid pressure indicator adapted to be disposed remotely to the container, a force exerting means exercising a substantially constant force on the movable means in opposition to the effect of liquid pressure exerted thereon and adapted to move it oppositely upon a reduction in value of the liquid pressure on said movable means, fluid pressure generating means, an actuating means for effecting operation of the pressure generating means operable responsive to a movement of said movable means effected by said force exerting means, the pressure generated being effective to commensurably operate said indicator and effective upon said movable means to approximately balance the opposing pressure of the liquid tending to move it, said force exerting means comprising a counter spring for said movable means, said pressure generating means comprising a fluid pressure chamber and pump means to vary the pressure of fluid contained therein, said actuating means comprising a set of electrical contacts, a source of electrical current, and electro-magnetic means effecting the operation of said pump means, said electro-magnetic means energizable by current from said source through said contacts.

8. In a liquid level indicating system for a liquid container, in combination, movable means subjected to the hydraulic pressure head of liquid in the container, and movable in a given direction responsive thereto, a fluid pressure indicator adapted to be disposed remotely to the container, a force exerting means exercising a substantially constant force on the movable means in opposition to the effect of liquid pressure exerted thereon and adapted to move it oppositely upon a reduction in value of the liquid pressure on said movable means, fluid pressure generating means, an actuating means for effecting operation of the pressure generating means operable responsive to a movement of said movable means effected by said force exerting means, the pressure generated being effective to commensurably operate said indicator and effective upon said movable means to approximately balance the opposing pressure of the liquid tending to move it, said force exerting means comprising a counter spring for said movable means, said pressure generating means comprising a fluid pressure chamber and means to vary the pressure of fluid contained therein, and venting means for said chamber adapted to continuously effect restricted communication between the said chamber and the atmosphere to tend to restore the fluid pressure in said chamber to atmospheric pressure.

9. In a liquid level indicating system for a liquid container, in combination, movable means subjected to the hydraulic pressure head of liquid in the container, and movable in a given direction responsive thereto, a fluid pressure indicator adapted to be disposed remotely to the container, a force exerting means exercising a substantially constant force on the movable means in opposition to the effect of liquid pressure exerted thereon and adapted to move it oppositely upon a reduction in value of the liquid pressure on said movable means, fluid pressure generating means, an actuating means for effecting operation of the pressure generating means operable responsive to a movement of said movable means effected by said force exerting means, the pressure generated being effective to commensurably operate said indicator and effective upon said movable means to approximately balance the opposing pressure of the liquid tending to move it, said force exerting means comprising a counter spring for said movable means, said pressure generating means comprising a fluid pressure chamber and pump means to vary the pressure of fluid contained therein, said actuating means comprising a set of electrical contacts, a source of electrical current, and electro-magnetic means effecting the operation of said pump means, said electro-magnetic means energizable by current from said source through said contacts, and venting means for said chamber adapted to continuously effect communication between the said chamber and the atmosphere to tend to restore the fluid in said chamber to atmospheric pressure.

10. In a liquid level indicating system for a liquid container, in combination, movable means subjected to the hydraulic pressure head of liquid in the container, and movable in a given direction responsive thereto, a fluid pressure indicator adapted to be disposed remotely to the container, a force exerting means exercising a substantially constant force on the movable means in opposition to the effect of liquid pressure exerted thereon and adapted to move it oppositely upon a reduction in value of the liquid pressure on said movable means, fluid pressure generating means, an actuating means for effecting operation of the pressure generating means operable responsive to a movement of said movable means effected by said force exerting means, the pressure generated being effective to commensurably operate said indicator and effective upon said movable means to approximately balance the opposing pressure of the liquid tending to move it, said force exerting means comprising a counter spring for said movable means, said pressure generating means comprising a fluid pressure chamber and means to vary the pressure of fluid contained therein, and venting means for said chamber adapted to continuously effect restricted communication between the said chamber and the atmosphere to tend to restore the fluid in said chamber to atmospheric pressure, and manually operable means to vary the rate of venting of said chamber by said venting means.

11. In a liquid level indicating system for a liquid container, in combination, movable means movable in a given direction responsive to the pressure of liquid near the bottom of the container, a fluid pressure indicator adapted to be disposed remotely to the container, a force exerting means exercising a force on the movable means approximately equal in effect to the pressure of liquid exerted upon the movable means when the container is approximately full of liquid, and opposing the effect of liquid pressure exerted upon said movable means and adapted to move it oppositely upon a reduction in value of said liquid pressure, an actuating means operable responsive to movement of said movable means, a fluid pressure generating means operative responsive to operation of said actuating means upon a movement of said movable means effected by said force exerting means, means for communicating the generated pressure to the indicator to operate it, and to the movable means to establish thereon a pressure approximately balancing the liquid pressure thereon.

12. Apparatus of the type described for indicating the depth of liquid in a tank or other receptacle, the said apparatus comprising an air compressor, a tube extending downward to near the bottom of said receptacle and having its lower end open, a line pipe connected to said tube and charged with air from said compressor, an indicating device connected to said line pipe and operated by the pressure in said line pipe, means actuating said air compressor, means operative when the pressure in said line pipe falls below that corresponding to that due to the depth of liquid to be indicated for starting said air compressor actuating means, and means operative when the pressure in said line pipe corresponds to that due to the depth of the liquid to be indicated for stopping said air compressor actuating means.

13. Apparatus according to the preceding claim wherein the means for actuating said air compressor comprises an electric motor and a source of electric current and the means for starting and stopping said actuating means, when the pressure in said line pipe falls below that corresponding to the depth of the liquid in the receptacle, and when the pressure in the line pipe corresponds to that due to the depth of said liquid, respectively, comprises means for connecting said source of electric current to said motor.

14. An apparatus for indicating the quantity of liquid in a container, comprising a liquid displacing element having a portion heavier than the displaced liquid and extending close to the bottom of the container and exposed to the buoyant effort of liquid therein, a pressure chamber having relatively stationary and movable walls, means for restrictedly conducting air from atmosphere to the chamber, a pressure gauge, a duct for effecting communication between the gauge and chamber, a fluid exhausting means, means adapted to effect communication between the interior of the chamber and the fluid exhausting means, a valve controlling the passage of air through the third means, means to communicate operative movement to said valve from said movable wall, and means to communicate actuating movement from the displacement element to the movable wall.

In testimony whereof I hereunto affix my signature this 22nd day of November, 1929.

FRANK M. SLOUGH.